April 23, 1963

D. F. COLE 3,086,623

PNEUMATIC TIMER

Filed July 20, 1959

INVENTOR.
DAVID F. COLE
BY
Oberlin, Maky & Donnelly
ATTORNEYS

April 23, 1963 D. F. COLE 3,086,623
PNEUMATIC TIMER
Filed July 20, 1959 3 Sheets-Sheet 2

INVENTOR.
DAVID F. COLE
BY
Oberlin, Maky & Donnelly
ATTORNEYS

April 23, 1963 D. F. COLE 3,086,623
PNEUMATIC TIMER

Filed July 20, 1959 3 Sheets-Sheet 3

INVENTOR.
DAVID F. COLE
BY
Oberlin, Maky & Donnelly
ATTORNEYS

United States Patent Office 3,086,623
Patented Apr. 23, 1963

3,086,623
PNEUMATIC TIMER
David F. Cole, 513 Beechwood Drive, Mansfield, Ohio
Filed July 20, 1959, Ser. No. 828,093
4 Claims. (Cl. 188—94)

This application is a continuation in part of my co-pending application Serial No. 695,248, filed on November 8, 1957, now Patent No. 2,913,976, dated November 24, 1959.

In such prior application, I have illustrated and described in detail an electric broiler in which a pneumatic timer is used for automatic control of the operation of the device. Such timer was developed to provide, at reasonable cost, the long cycle time control needed for broiling meat and the like, since it was found that the commercially available timing devices of relatively inexpensive type, e.g. thermostatic contactors, operated on time cycles which were much too short for the broiling of meat and other foods likewise requiring fairly long exposure to heat; the only long interval timers then noted as available were of spring or motor type and too costly to be practical in production of a reasonably priced appliance of the nature involved. The pneumatic timer disclosed in my earlier application thus provides, basically, a long interval timing device, with an operating range of from about three to about seven minutes, at comparatively low manufacturing cost. The present application is concerned with such timer and further improvements which have been made in both the construction of this timer and manufacture of its principal components.

Unlike most dash-pot assemblies which have been suggested in the art for timing functions, my pneumatic timer does not rely on any spring drive of the piston, a feature which not only complicates the mechanism and constitutes a source of breakage and wear but also introduces a potential variable in the timing cycle. As will be described in detail hereinafter, the new timer comprises a vertical cylinder and a specially formed piston which is directly or indirectly elevated by hand and permitted to descend by gravity, with the discharge of air from the space beneath the piston being regulated and the down stroke providing the movement from which the desired time control is derived. The piston assembly is not only of special design, but made of the same metal as the cylinder and so precisely formed with respect to the latter that metal-to-metal contact adequately and efficiently seals the piston without requiring separate gaskets and the like. As a result of this feature, the timer is well-protected against variable cycling due to ambient temperature changes, such possible adverse effect being of course of particular concern in any timer incorporated in a heating device, especially in the case of temperature responsive timers which should not only be compensated for ambient temperature changes but also for residual heating on re-cycling.

In addition to providing a pneumatic timer as and operative in the improved manner discussed above, it is an object of the present invention to provide a technique for producing the cylinder and piston of this pneumatic timer rapidly and inexpensively and, further, in such fashion as to ensure the precise fit of these components which permits the highly advantageous assembly thereof earlier set forth. A related object is to provide for manufacture of a cylinder-piston pneumatic timer with the cylinder and piston forming operations capable of being carried out rapidly in automatic machine tools; a further object is to eliminate any need for machining of such parts in the final stages of production of the same.

It is also an object of the present invention to provide such a pneumatic timer having novel and improved actuating mechanism whereby the same is set or conditioned to perform its timing function. Another object is to provide adjustable actuating means for such a timer, without reliance on valve regulation or the like.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figures 1, 5:
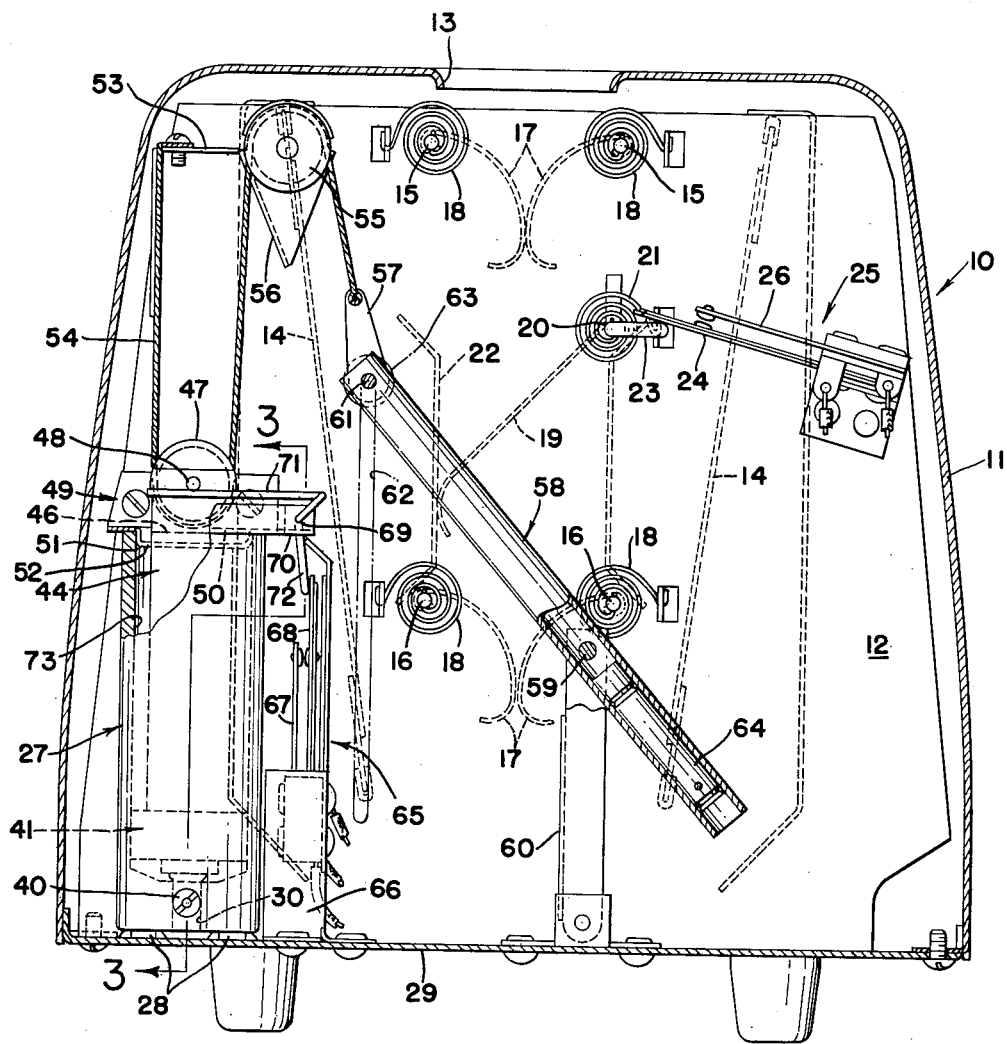
FIG. 1 is a transverse sectional view of an electric cooking device, such as a broiler, equipped with a pneumatic timer in accordance with the present invention.
FIG. 5 is a wiring diagram for the broiler.

Referring now to the drawings in detail, reference numeral 10 designates generally an electric broiler here shown only to the extent that the description of such an illustrative time-controlled appliance might assist explanation and understanding of the pneumatic timer which forms the subject matter of the present invention. Such broiler is, moreover, in its unillustrated structure, essentially the same as the broiler shown in my earlier noted co-pending application to which reference may of course be had, if desired, for further description of a complete appliance of this nature.

This broiler comprises an outer casing 11 having therewithin a transverse partition or wall 12 fairly close to one end and serving to form a timer compartment at such end distinct from the main or heating compartment. A top slot 13 in the casing over the main compartment is provided for insertion of the food to be cooked, with the food supported, for example, in a detachable holder of the nature shown in my co-pending application. Also as fully shown in said application, and as is customary in such devices, suitable electric heating units 14 of plate form are supported at opposite sides of the food-receiving space beneath the top slot.

The partition 12 supports upper and lower rock shafts 15 and 16, respectively, correspondingly positioned at each side of the central food chamber, and curved fingers 17 are secured in opposition to the upper and lower sets of such shafts where the same project into such chamber. Such pairs of fingers normally are in contact below the slot 13, as shown, and are spread apart by insertion of the food holder therebetween. External coil springs 18 connected between the outer shaft ends and the partition 12 resiliently oppose such separation of the fingers, whereby the latter are operative to press against the sides of the holder to locate the same and, if hinged, to ensure that the holder remains closed against the food therein.

A further arm 19 is positioned in the heating compartment, extending at a downward angle across the food-receiving chamber between the upper and lower sets of the spring fingers 17. Such further arm is secured to a shaft 20 likewise extending through the partition 12 and provided with a biasing coil spring 21, with upward movement of the arm limited by its free end engagement with a retainer strip 22 located at the opposite side of the heating chamber. The outer end of the shaft 20, within the timing compartment, however, has an angular extension 23 which serves as an actuator for one of the contact blades 24 of a control switch 25 mounted on the partition. The function of this switch will be later described, but it will be apparent here that the blade 24 is normally held away from the cooperable contact blade 26, whereby this switch is normally open, and further that when the arm 19 is depressed upon insertion of the food holder, the shaft extension 23 is turned to move the blade 24 against the blade 26 and thereby close the switch.

Figure 3:
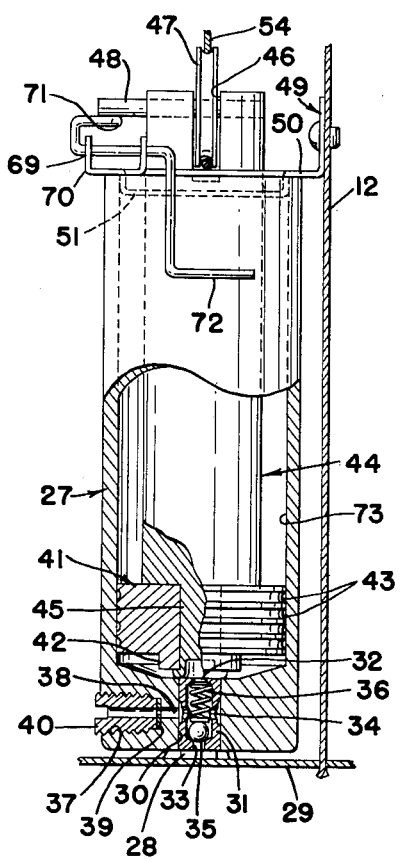
FIG. 3 is a vertical section of the timer, to an enlarged scale, taken approximately on the line 3—3 in FIG. 1.

The pneumatic timer illustrated comprises a cylinder 27 arranged vertically in the timing compartment and located in position by having small bottom protuberances 28 fitted in upwardly embossed openings in the housing bottom 29. This cylinder is open at the top and has a reduced central aperture 30 in its otherwise closed bottom. The inner surface of the bottom wall is dished, as best shown in FIG. 3, and a check valve body 31 is fitted in the bottom opening 30. Such body is chambered, with an upper port 32, a lower port 33, and a lateral through hole 34 intermediate its ends; the lower end of the inner chamber thereof forms a seat on which a steel ball 35 is seated and resiliently held by a spring 36 thereabove. The bottom portion of the cylinder 27, which is fairly thick, is also provided with a tapped, radially directed recess 37, and a small orifice 38 extending from the inner end of such recess to the opening 30 in which the check valve body 31 is fitted, in register with the through hole 34 of the latter. An orifice disc 39, which is simply a thin circular piece with a central hole of predetermined size, is positioned in the recess 37 against the inner end, and accordingly about the orifice 38, and a disc-retaining screw 40 having a bore is threaded in the recess against the removable and hence interchangeable orifice disc 39.

Figure 4:
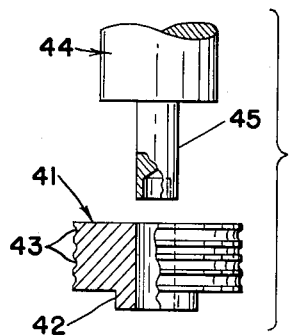
FIG. 4 shows separately the piston and piston rod end receiving the same.

The piston 41 of the timer, as best illustrated in FIG. 4, has a central opening and a short bottom extension 42 of reduced diameter, such piston being sized to fit precisely in sealed relation in the cylinder bore. In this particular figure, and some others as well, the piston is shown as having peripheral grooves 43 which of course reduce the contact surface area, but this feature is not regarded as essential and in FIG. 6, the piston is shown without such grooves. The piston rod 44 is of substantial diameter as shown, resembling more closely a solid cylinder, and the diameter of this rod may, for example, be approximately three-fourths of the major piston diameter. The lower end of this rod has an integral axial extension 45 on which the piston 41 is fitted, and the end of such extension, recessed for the purpose, is peened over against the bottom of the piston to unite the two.

The upper end of the piston rod 44 is provided with a diametrical slot 46 in which a pulley 47 is mounted for rotation on a shaft 48 passed through the slotted end at right angles to the slot 46. A specially formed bracket 49, fastened as shown to the partition 12 both stabilizes the upper end of the cylinder 27 and guides the piston rod 44 therein. Such bracket is, in major part, in the form of a horizontal plate 50 having a depressed ring section 51 through which the piston rod extends and a series of small cut-outs 52 (FIG. 2) about the edge of the ring opening, so that the air may flow freely to and from the space within the cylinder above the piston.

A further bracket 53 (FIG. 1) is mounted on the partition 12, near the top of the same, to extend over the timer, and a cable 54 secured at one end to such bracket extends downwardly and about the piston rod pulley 47. The cable then extends upwardly and over a stationary pulley 55 mounted on a partition-supported bracket 56, the axis of which is approximately the same elevation as the fixed end of the cable. The other or free end of the cable is provided with a small connector plate 57 pivotally secured to one end of a tubular operating lever 58.

Figure 2:
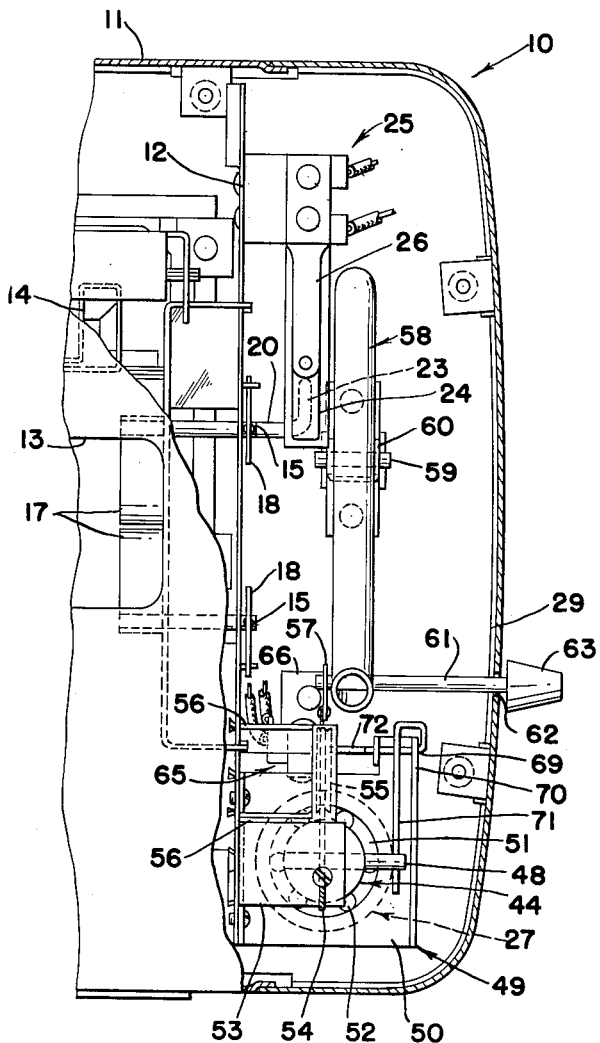
FIG. 2 is a fragmentary top view of such cooking device, with the top wall thereof broken away to expose the compartment thereof in which the timer is located.

This lever is pivotally connected intermediate its ends at 59 to a link 60 pivotally mounted at the bottom of the housing. As best shown in FIG. 2 the pivotal connection of the cable connector 57 to the lever 58 is provided by a horizontal shaft which not only extends through the lever to receive such connector but also outwardly through the end wall of the casing 11, within a vertical slot 62 provided in the latter for such purpose. An operating knob 63 is fitted on such external projecting end of the shaft, and a suitable vertically graduated time scale, not shown, will be provided alongside such slot, at the outer surface, as will be discussed further hereinbelow. The other end of the tubular operating lever 58, at the opposite side of the pivot 59 thereof, has a counterweight 64 secured therewithin.

It will now be apparent that the timer is actuated or set by lifting of the piston 41 and piston rod 44, with air being admitted freely to the interior of the cylinder beneath the piston through the bottom ball check valve; when released after being thus elevated, the piston and rod descend of their own weight by gravity, the check valve is of course closed, and the air trapped beneath the piston must escape through the lateral orifice 38 and the orifice disc 39. The descending assembly of piston and rod is of constant mass and, accordingly, there are two factors which determine the time required for the piston to move from its particular elevated position to its lowermost rest position. One such factor is the size of the discharge or bleed orifice in the disc 39, and this can be factory adjusted in accordance with the particular timing range desired. The second factor is the height to which the piston is elevated, and this variable is used to provide adjustable timing by the user.

The piston is of course lifted by depressing the operating knob 63, and the aforementioned visible scale which will be provided alongside the end slot 62 will be calibrated in time increments proportional to particular selected distances of downward travel of the knob. Such lifting is accomplished through the pulley and cable arrangement shown which provides a two-to-one mechanical advantage, whereby a fairly heavy assembly of piston and rod may easily be lifted. Furthermore, the link system comprising the counter-weighted lever 58 and link 60 are provided to counter-balance the weight of the projecting shaft 61 and cable connector 57, whereby such assembly is weightless as far as the piston assembly is concerned and the mass of the latter thereby serves invariably and accurately to determine proper timing in all positions of adjusted timer setting.

For control of the electric broiler discussed, the illustrated pneumatic timer actuates an electric control switch 65 mounted vertically adjacent the timer on a base 66. Such switch comprises a stationary contact blade 67 and a cooperable movable contact blade 68, the latter of which is biased normally against the blade 67 for closure of the switch. A switch actuator is pivoted at 69 on an extension 70 of the cylinder bracket 49 and has a first end portion 71, off-set from the pivot 69, which extends in the path of the shaft 48 on which the pulley 47 is mounted in the top of the piston rod 44. The other end 72 of such actuator, which is rod-like, extends downwardly into engagement with the movable switch blade 68 at the contact point side of the same.

As shown in FIG. 1, when the piston is in its lowered position, the piston rod shaft 48 engages the switch actuator section 71 and holds the same substantially horizontal, with the lower end 72 of the actuator in this condition holding the movable switch blade 68 away from the stationary blade 69, whereby the control switch 65 is open. As soon as the piston is lifted, this actuator is free to rock, in a clockwise direction in FIG. 1 about its pivotal mounting, as the result of the spring bias of the movable contact blade 68, so that such switch closes and will remain closed until the piston descends to its lowered condition and the shaft 48 engages and rocks the actuator in the reverse direction.

The wiring of this particular electric appliance is shown in FIG. 5 and it will be seen therefrom that the first-mentioned upper switch 25 is in series with the timer-controlled switch 65 and the electric heating units 14. The function of the timer-controlled switch will be obvious, and it will be seen that the upper switch 25 precludes energization of the heating elements as the result of inadvertent manipulation of the operating knob. That is, the switch 25 is normally open and closed only by displacement of its actuator 19 incident to insertion of the food holder in the device.

As indicated at the outset, the cylinder 27 and piston 41 of this new timer are made of the same metal, and for production advantages to be discussed, it is preferred that this be a light metal and, in particular, aluminum. The piston and cylinder bore are accurately sized for the precise fit, which as also noted earlier, eliminates any need for separate seals; the surfaces of contact of the two are hard and have a mirror finish. It has been further pointed out that the piston surface may be serrated or not, and where a smooth-wall piston is employed, the same is desirably lightly coated with a lubricant, such as a light oil, polytetrafluoroethylene, colloidal tetrafluoroethylene in a phenolic resin, colloidal graphite in an alkyd resin base, molybdenum disulfide, or graphite in an epoxy resin base.

Figure 6:
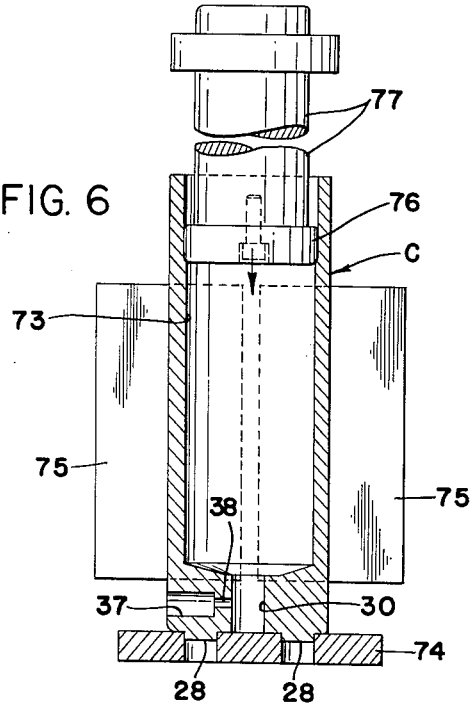
FIG. 6 illustrates in simplified form the fixture used in the last stage of production of the timer cylinder.

With regard now to the production of this cylinder, a cylinder blank C shown in FIG. 6 is formed by conventional impact extrusion, such blank preferably being made of aluminum and hard coated by anodizing. The bore 73 of such extruded blank is slightly undersize, or less than the intended final diameter, and the blank is mounted in a suitable punch machine including a pressure pad 74 and adjustable encircling side clamps for the blank, two of the four clamps used being shown at 75. This machine employs a short cylindrical punch 76 made of tungsten carbide, or nitrided steel, with a mirror-finished periphery of the desired final diameter of the cylinder bore and its upper and lower peripheral edges slightly rounded as shown.

The cylinder blank C is of course accurately positioned and clamped in upright condition with respect to and for entry of the punch, and the latter is reciprocably driven by a ram 77. The punch 76 thus functions as an inner die operative both to size the bore and finish the surface of the same, often in a single reciprocation.

The more conventional way of forming such a cylinder would involve reaming the bore and then honing the same to remove the machining marks; in the method employed in accordance herewith, the sizing and finishing are now accomplished in a single operation and no machining is required. The bore surface is given a mirror finish of 25 micro-inches or better and preferably from 16 to 24 micro-inches.

Figure 7:
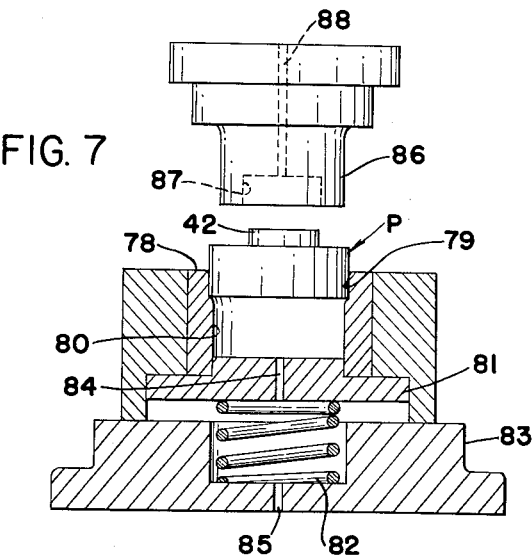
FIG. 7 is similarly a simplified illustration of the final operation performed in making the piston of the timer.

With reference to FIG. 7, the piston is formed from a slightly over-size blank P in a conventional screw machine from bar stock, again preferably of aluminum and anodized. Such blank P is disposed, with its reduced extension uppermost, in an outer sizing die assembly, the working part of which is a sleeve insert 78 of tungsten carbide or nitrided steel. The internal diameter of such die is slightly enlarged over an upper end portion 79 and of the desired final diameter of the piston over its remaining portion 80, the latter being of greater height than the piston body. A pressure pad 81 is positioned in the bottom of the die and held normally extended partially into the same by means of a spring 82; the pressure pad and the base 83 on which the die assembly is mounted are provided are provided with air vents 84 and 85. A ram 86, vertically reciprocated with respect to the die assembly by suitable drive means not shown, is adapted to engage the piston blank P as seated in the upper somewhat enlarged die opening and force the same downwardly into the sizing die section. Such ram is provided with a recess 87 to accommodate the piston extension and a vent 88 for escape of air. After sizing of the piston and withdrawal of the ram, the piston is lifted by the spring-biased pressure pad 81, which could also be actuated by a fluid cylinder for such purposes of ejection. A suitable drawing oil may be used in this sizing operation, and in the cylinder sizing previously described as well.

It will accordingly now be seen that the cylinder and piston can not only be rapidly produced, but reliably to the very close tolerances obviously required for proper assembly of the two in the pneumatic timer described and for proper operation of such timer. In addition to the details already noted, the cylinder 27 in the preferred embodiment of the timer has an overall height of 3½ in., with its bore being approximately 1 in. in diameter and its bottom will $7/16$ in. thick at the center. The fixed bleed orifice 38 is $1/16$ in. in diameter, while the check valve is $3/32$ in. in diameter. The diameter of the piston 41 is also approximately 1 in., with just enough tolerance to permit reciprocation thereof in the cylinder without leakage of air, and of a height approximately equal to $13/32$ in.; when serrated, the peripheral surface of the piston is reduced by slightly more than half.

The piston rod 44 is preferably made of corrosion-resistant steel, for added weight, and in the noted embodiment its length, excluding the attaching extension, is approximately 2½ in. and its diameter ¾ in. This particular timer has a timing range on the order of from three to seven minutes.

Other modes of applying the principle of the invention may be employed, change being made as regards the details described, provided the features stated in any of the following claims or the equivalent of such be employed.

I, therefore, particularly point out and distinctly claim as my invention:

1. A pneumatic timer comprising an upright hollow cylinder open at the top and having a bottom closure, a piston of relatively short vertical extent in relation to the height of the cylinder reciprocable in the latter with its periphery in contact with the inner cylinder wall, a piston rod secured to said piston having a substantial length and a diameter more than half that of the piston, unidirectional valve means in such bottom closure for freely admitting ambient air to the cylinder beneath the piston upon elevation of the latter, an exhaust passageway provided in such bottom closure for discharge of the thus contained air in the cylinder when the elevated piston is free to descend by gravity, a member removably inserted in said passageway operative to determine the rate of such discharge through the same, said member having an orifice of predetermined size through which air must flow in proceeding along the passageway, a manually depressible operating member interconnected with the piston assembly so that depression thereof elevates such assembly, release of the depressed member freeing the piston assembly for its such descent and, through such interconnection, return of the member to an elevated start position, and weighted lever means for counterbalancing said operating member for such return thereof without loading of the piston assembly.

2. In a pneumatic timer, a vertical hollow cylinder open at the top and closed at the bottom, a piston of relatively short vertical extent in relation to the height of the cylinder reciprocable in the latter with its periphery in contact with the inner cylinder wall, a piston rod secured to said piston having a substantial length and a diameter more than half that of the piston, force-multiplying means connected to said piston rod for manual lifting of the piston in the cylinder, air inlet means for freely admitting ambient air to the space in the cylinder beneath the piston when the same is raised therein, restricted air outlet means through which air is discharged from the cylinder interior below the piston as the same descends by gravity, and counterbalancing means connected to said force multiplying means for return thereof as said piston descends without loading of the piston assembly.

3. A pneumatic timer comprising an upright hollow cylinder open at the top and having a bottom closure, a piston reciprocable in air-sealed relation within said cylinder, unidirectional valve means in such bottom closure for freely admitting ambient air to the cylinder beneath the piston upon elevation of the latter, an exhaust passageway provided in such bottom closure for discharge of the thus contained air in the cylinder when the elevated piston is free to descend by gravity, a member removably inserted in said passageway operative to determine the rate of such discharge through the same, said member having an orifice of predetermined size through which air must flow in proceeding along the passageway, manually operated means for lifting the piston in the cylinder, means for guiding movement of said manually operated means along a predetermined path having visibly defined end limits, whereby the movement of the manually operated means and hence the degree of lifting of the piston can be gauged in reference to such end limits, and means connected to said manually operated means operative to counterbalance said manually operated means.

4. A pneumatic timer comprising an upright hollow cylinder open at the top and having a bottom closure, a piston of relatively short vertical extent in relation to the height of the cylinder reciprocable in the latter with its periphery in contact with the inner cylinder wall, a piston rod secured to said piston having a substantial length and a diameter more than half that of the piston, air inlet means for freely admitting ambient air to the space in the cylinder beneath the piston when the same is raised therein, restricted air outlet means through which air is discharged from the cylinder interior below the piston as the same descends by gravity, a manually depressible operating member, a flexible connector and pulley system interconnecting said member and the piston assembly so that depression of the former is effective with mechanical advantage to raise the latter, release of the depressed member freeing the piston assembly for its such descent and, through such interconnection, return of the member to an elevated start position, and means for counterbalancing said operating member for such return thereof without loading of the piston assembly comprising an intermediately pivotally mounted lever having one end thereof connected to said operating member and the other end thereof provided with a counterweight.

References Cited in the file of this patent

UNITED STATES PATENTS

| | | | |
|---|---|---|---|
| 85,113 | Mackerley | Dec. 22, | 1868 |
| 491,794 | Barker | Feb. 14, | 1893 |
| 548,413 | Adams | Oct. 22, | 1895 |
| 715,797 | Heany | Dec. 16, | 1902 |
| 1,608,877 | Elliott | Nov. 30, | 1926 |
| 1,691,915 | Bourgeois | Nov. 20, | 1928 |
| 1,732,344 | Tevander | Oct. 22, | 1929 |
| 1,905,062 | Schaeffers | Apr. 25, | 1933 |
| 2,344,358 | King | Mar. 14, | 1944 |
| 2,346,291 | Cisski | Apr. 11, | 1944 |
| 2,392,449 | Austin | Jan. 8, | 1946 |
| 2,481,862 | Muller et al. | Sept. 13, | 1949 |
| 2,546,038 | McIntyre et al. | Mar. 20, | 1951 |
| 2,685,729 | Daub | Aug. 10, | 1954 |
| 2,913,976 | Cole | Nov. 24, | 1959 |